United States Patent [19]

Forsberg et al.

[11] Patent Number: 4,920,545
[45] Date of Patent: Apr. 24, 1990

[54] METHOD AND APPARATUS FOR TRANSMITTING A SYNCHRONOUS DATA SIGNAL ON A TRANSMISSION MEDIUM ON WHICH THE TRANSMISSION RATE IS GREATER THAN THE DATA SIGNAL BIT RATE

[75] Inventors: Gunnar S. Forsberg, Stockholm; Stefan E. Josefsson, Hägersten, both of Sweden

[73] Assignee: Telefonaktiebolaget L M Ericsson, Stockholm, Sweden

[21] Appl. No.: 275,052

[22] PCT Filed: Mar. 3, 1988

[86] PCT No.: PCT/SE88/00100
§ 371 Date: Nov. 14, 1988
§ 102(e) Date: Nov. 14, 1988

[87] PCT Pub. No.: WO88/07301
PCT Pub. Date: Sep. 22, 1988

[30] Foreign Application Priority Data
Mar. 11, 1987 [SE] Sweden .............................. 8701013-8

[51] Int. Cl.$^5$ .................................................. H04B 15/00
[52] U.S. Cl. .......................................... 375/58; 375/120
[58] Field of Search ................ 375/26, 34, 42, 58, 375/106, 108, 119; 380/11, 12, 35, 42; 455/50, 51, 63; 370/6, 12

[56] References Cited
U.S. PATENT DOCUMENTS
3,244,808 4/1966 Roberts ................................. 375/34
3,564,414 2/1971 Ebert .................................... 375/112

*Primary Examiner*—Benedict V. Safourek
*Assistant Examiner*—Tesfaldet Bocure
*Attorney, Agent, or Firm*—Burns, Doane, Swecker & Mathis

[57] ABSTRACT

A method and apparatus for transmitting a synchronous data signal (D1) on a transmission medium (2) on which the transmission rate (Y bits/s) is greater than the data signal bit rate (X bits/s). The data signal is converted in a transmitter by over-sampling with a sampling frequency (Y Hz) which is equal to the transmission rate (Y bits/s) on the transmission medium (2), whereafter the data signal (D2) formed by the conversion is transmitted on the transmission medium (2). A clock signal (C2) is formed in a receiver, this signal being phase-locked to the transmitted data signal (D2') and has a frequency (X Hz) equal to the bit rate (X bits/s) of the original, synchronous data signal (D1), subsequent to which the transmitted data signal (D2') is re-sampled with the clock signal (C2) formed in the receiver. To avoid problems which can be caused by certain special bit combinations of the synchronous data signal (D1) or of certain special frequency conditions between it and the transmitted signal (D2'), the data signal (D1) is converted in the transmitter such that an uneven distribution of the edges of the transmitted data signal (D2') in relation to their mean positions is avoided.

8 Claims, 4 Drawing Sheets

METHOD AND APPARATUS FOR TRANSMITTING A SYNCHRONOUS DATA SIGNAL ON A TRANSMISSION MEDIUM ON WHICH THE TRANSMISSION RATE IS GREATER THAN THE DATA SIGNAL BIT RATE

TECHNICAL FIELD

The invention relates to a method and apparatus for transmitting a synchronous data signal on a transmission medium on which the transmission rate is greater than the data signal bit rate, wherein the data signal in a transmitter is converted by its being over-sampled with a sampling frequency which is equal to the transmission rate on the transmission medium, that the data signal formed by the conversion is transmitted on the transmission medium, wherein a clock signal is formed in a receiver such that this signal is phase-locked to the transmitted data signal and has a frequency which at least practically is equal to the bit rate of the original, synchronous data signal, and wherein the transmitted data signal is re-sampled with the clock signal formed in the receiver.

BACKGROUND ART

An apparatus according to the above is already essentially known from the U.S. Pat. No. 3819853.

In an apparatus of this kind there can be problems, should certain special bit combinations occur in the synchronous data signal which is supplied to the transmitter, or should certain special frequency conditions prevail between the synchronous data signal and the transmitted data signal. This can result in an uneven distribution of the edge positions of the transmitted data signal in relation to their mean positions. In turn, this can cause the clock signal generated in the receiver to be incorrectly locked, i.e. that the signal will not be locked to the mean positions proper of the edges. In an unfortunate case, for example, all the received edges except one could be situated on one side of the mean position and the remaining one a long way out on the other side of the mean position. Practically speaking, the clock signal would then be locked to the mean position of the edges situated on one side of the mean position proper. The edge situated on the other side of the mean position would only give rise to short-duration floating of the locked-in position of the clock signal. If the locked loop were to be made sufficiently low-frequency (slow) to avoid this it would lose its locking-in ability completely.

DISCLOSURE OF INVENTION

The object of the present invention is to propose a method of the kind mentioned in the introduction, according to which the above mentioned problems are avoided. This is achieved by the synchronous data signal in the transmitter being converted such that uneven distribution according to the above of the edges of the transmitted data signal is avoided. Accordingly there is also avoided incorrect locking-in of the clock signal generated in the receiver. The invention also relates to an apparatus for carrying out the method.

The characterizing features of the invention are apparent from the claims.

BRIEF DESCRIPTION OF DRAWINGS

The invention will now be described in more detail below with reference to the drawings, on which

BEST MODES FOR CARRYING OUT THE INVENTION

Figure 1:
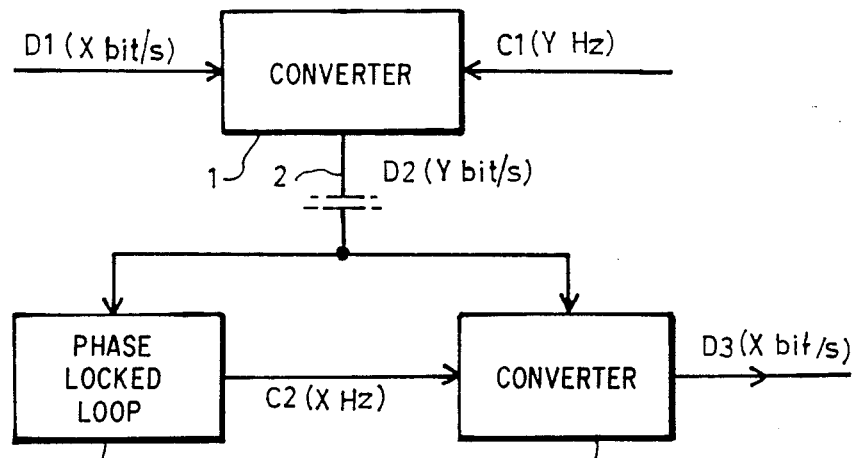
FIG. 1 illustrates an example of a known apparatus for transmitting a synchronous data signal.
Figure 2:
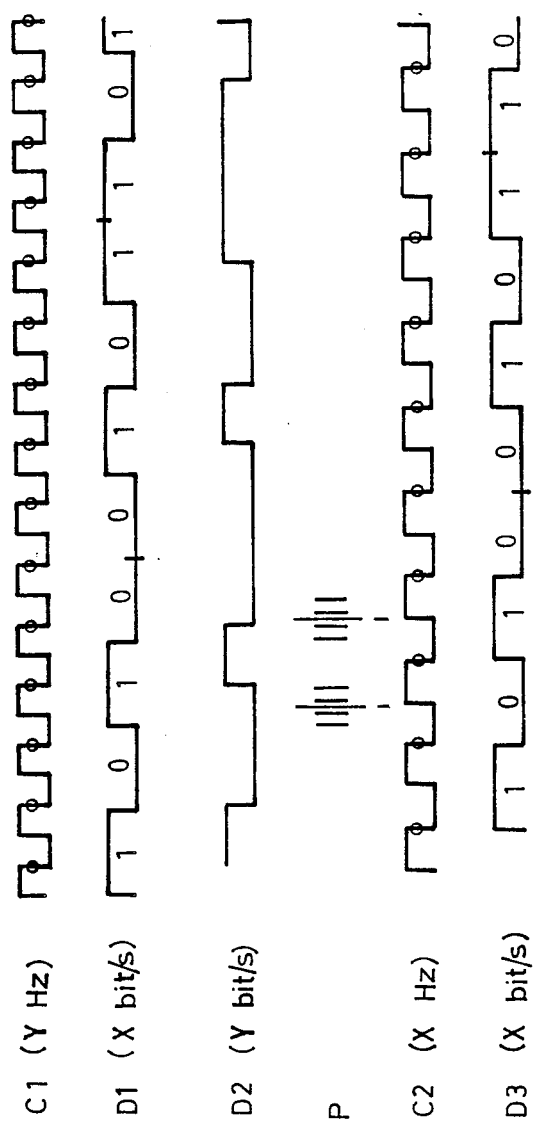
FIG. 2 is a diagram illustrating examples of signals and parts of signals occurring in the apparatus according to FIG. 1.

In FIG. 1 there is illustrated an example of a known apparatus for transmitting a synchronous data signal, and in FIG. 2 there are illustrated examples of signals occurring in the apparatus according to FIG. 1. A conversion means included in a transmitter is denoted by the numeral 1. The conversion means obtains a synchronous data signal D1 with the bit rate X bits/s on a data input and a clock signal C1 with the frequency Y Hz on a clock signal input. In the example, Y is 1.4 times as great as X. The synchronous data signal D1 with the bit rate X bits/s is converted in the means 1 to a data signal D2 with the bit rate Y bit/s. The conversion takes place with so-called over-sampling, by which is intended that the input signal D1 is sensed at a frequency which is greater than its bit rate, the signal D2 being formed by each sensed value being retained from the respective sampling instant to the next sampling instant. The so-called over-sampling degree, Y/X, is 7/5 in the example, which signifies that the signal D2 is formed by the signal D1 having been sensed at a sampling frequency which is 1.4 times its bit rate. The signal D1 is sensed at the falling edges of the clock signal C1, which is denoted by circles.

The signal D2 can be regarded as a data signal with a bit rate X bits/s and which is burdened with time jitter, i.e. with phase variations in the edges. However, it can also be regarded as a data signal with the higher bit rate Y bits/s which is free from jitter.

The data signal D2 is transmitted from the conversion means 1 to a receiver on a line 2, on which the transmission rate is Y bits/s. The signal D2 is supplied to a means 3 adapted to generate a clock signal C2 having the frequency X Hz and which is phase locked to the received data signal D2. The data signal D2 is also supplied to a data input on a conversion means 4, which obtains the clock signal C2 from the means 3 on a clock input.

The means 3 suitably includes a phase-locked loop and a controlled oscillator, the output signal of which forms the clock signal C2. The phase-locked loop performs a mean value formation of the incoming phase positions of the edges in the data signal D2 and phase-locks the oscillator signal, i.e. the clock signal C2, so that its rising edges coincide with the mean value of the instants for the different incoming edges of the signal D2. These edges will be distributed in a manner which will be seen under the denotation P in FIG. 2 in relation to the phase-locked clock signal C2 with the frequency X Hz. The edges form groups, of which two are shown in the Figure. In the illustrated example only four edges are included in each group. The region free from edges between two groups is usually called the "eye". The size of the eye increases with the over sampling degree and occupies only about 10% of the total region of eye and edges at the over-sampling degree of 1.25, i.e. when Y/X=1.25. In certain cases the edges are not evenly distributed within each group, which will be explained more clearly in connection with FIGS. 4-6.

If the edges are evenly distributed within each group, the rising edges of the clock signal C2 can be caused to be locked at the centre of each group of edges. The falling edges of the clock signal will then occur at the centre of the eye, which means that they will occur at the centre of each received data bit.

The conversion means 4 converts the data signal D2 to a data signal D3 with the bit rate X bits/s and which is free from time jitter. The conversion takes place by so-called re-sampling under the control of the phase-locked clock signal C2, the sampling instants being determined by the falling edges of the clock signal, which have been denoted by circles. By "re-sampling" is intended that a data signal D3 is formed by each sensed value from the signal D2 being retained from the respective sampling instant to the next sampling instant. Since resampling takes place at a sampling frequency X Hz, which is equal to the bit rate of the data signal D1 supplied to the transmitter and the sampling instants occur at the middle of the mean instants for the trailing and leading edges of the signal D2, the synchronous data signal D1 will be reformed with less than one bit's delay.

Figure 3:
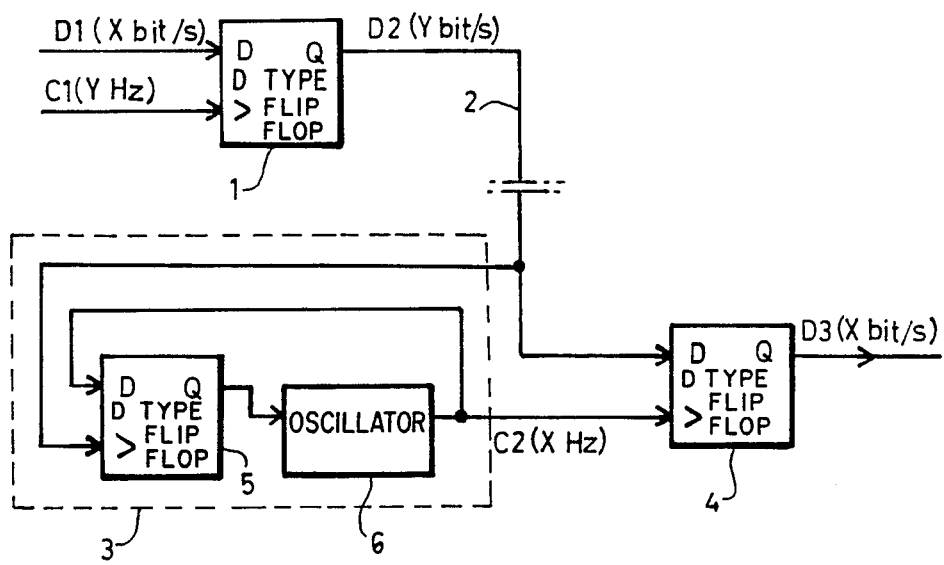
FIG. 3 illustrates a more detailed implementation of the embodiment according to FIG. 1.

In FIG. 3 there is illustrated a more detailed implementation of the apparatus according to FIG. 1. The conversion means 1 and 4 are D-flip-flops. The means 3 comprises a D-flip-flop 5 and a controlled oscillator 6. The D-flip-flop 5 is connected by its clock input to the line 2 from the transmitter and by its output to a control input on the oscillator 6. The clock signal C2 from the oscillator 6 is supplied to the clock input of the flip-flop 4 and also to the data input of the flip-flop 5. The oscillator 6 is adapted to generate a frequency somewhat exceeding X Hz when it obtains a logical 1 on its control input and otherwise a frequency somewhat falling below X Hz, or vice versa. The frequency can be $X_+$ or $-200 \times 10^{-6} \times X$ Hz, for example.

With this implementation of the means 3 there is achieved that the falling edges of the clock signal C2 are always locked at the centre of the eye.

According to the described method, a synchronous data signal can be transmitted in a simple way on a transmitting medium on which the transmission rate is greater than the bit rate of the synchronous data signal. The transmission medium bandwidth is utilized effectively, simultaneously as the lag only reaches a maximum of one data bit. The over-sampling degree, i.e. Y/X, should be at least 1.25 in practice, for the phase locking to function satisfactorily. The rising and falling edges can naturally be arranged differently while retaining the same result.

For a small over-sampling degree, e.g. 1.25, it is essential that the data signal D1 supplied to the transmitter does not include repetitive sequences of several successive logical 1 pulses followed by several successive logical 0 pulses. Such sequences can namely cause the clock signal C2 to be incorrectly phase-locked to one end of the above-mentioned edge groups, which can cause bit errors. It is also advantageous if the quotient Y/X is not a low denominator fraction, e.g. 3/2 or 4/3, which can cause the edges of the data signal D2 to be unevenly distributed within the edge groups. This can also cause the clock signal to be incorrectly phase-locked to the signal D2, which can result in bit errors.

Figure 4:
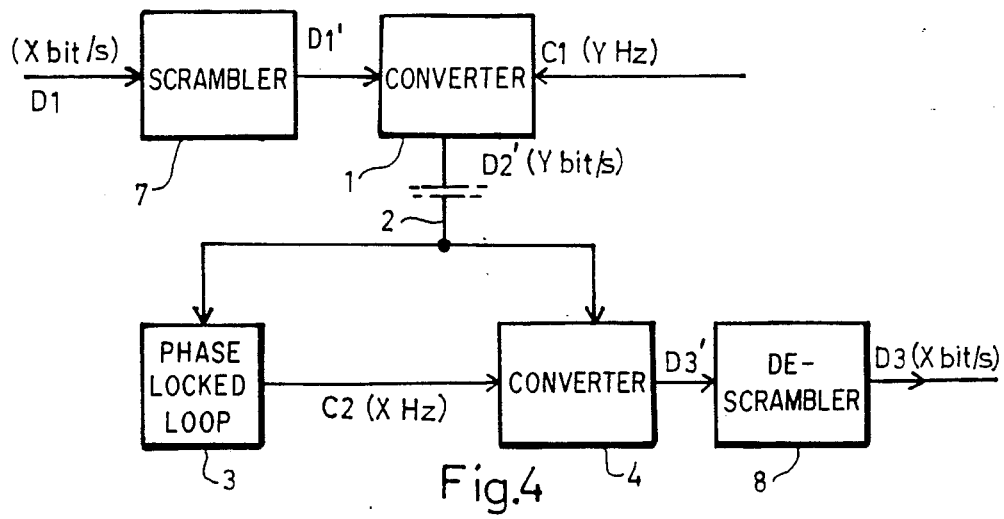
FIGS. 4-6 illustrate first, second and third embodiments of an apparatus in accordance with the invention.

In FIG. 4 there is illustrated a first embodiment of an apparatus in accordance with the invention. The apparatus agrees with the one according to FIG. 1, but is also provided with a conversion means 7 before the conversion means 1 and a conversion means 8 after the conversion means 4. The conversion means 7 may constitute a scrambler and is adapted to convert the synchronous data signal D1 so that a data signal D1' is formed which has a random distribution, whereby fixed patterns of logical 1's and 0's are avoided. The oversampled data signal formed by the conversion means 1 is here denoted by D2'. The conversion means 8 can be such as a descrambler and is adapted to reform the original data sequence from the random distribution denoted D3' obtained from the conversion means 4. There is thus avoided the problem which can be caused by unpermitted data sequences according to the above.

Figure 5:
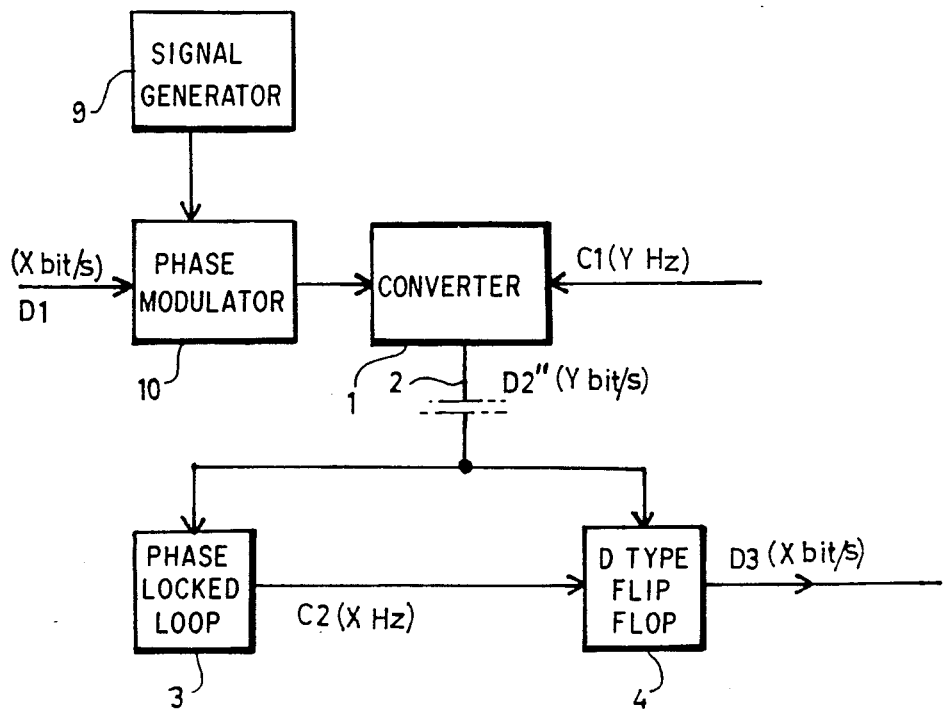

In FIG. 5 there is illustrated a second embodiment of an apparatus in accordance with the invention. The apparatus agrees with the one in FIG. 1 but is provided with a signal generator 9 and a phase modulator 10. The signal generator 9 generates a sinus signal and the phase modulator 10 is adapted to phase modulate the incoming data signal D1 in response to the phase position of the sinus signal. Phase jitter is thus inserted in the edges of the data signal D1 already before this signal is supplied to the conversion means 1. At least for some phase amplitudes, this results in that the transmitted edges will be evenly distributed within the edge groups. In this way there is avoided the problem with the uneven distribution of the edges which can occur when the quotient Y/X is a low denominator fraction. In addition, the problem with unpermitted data sequences is reduced. The data signal formed by the conversion means 1 is here denoted by D2". No phase demodulator is required in the receiver due to the phase-locked loop functioning per se as such.

Figure 6:
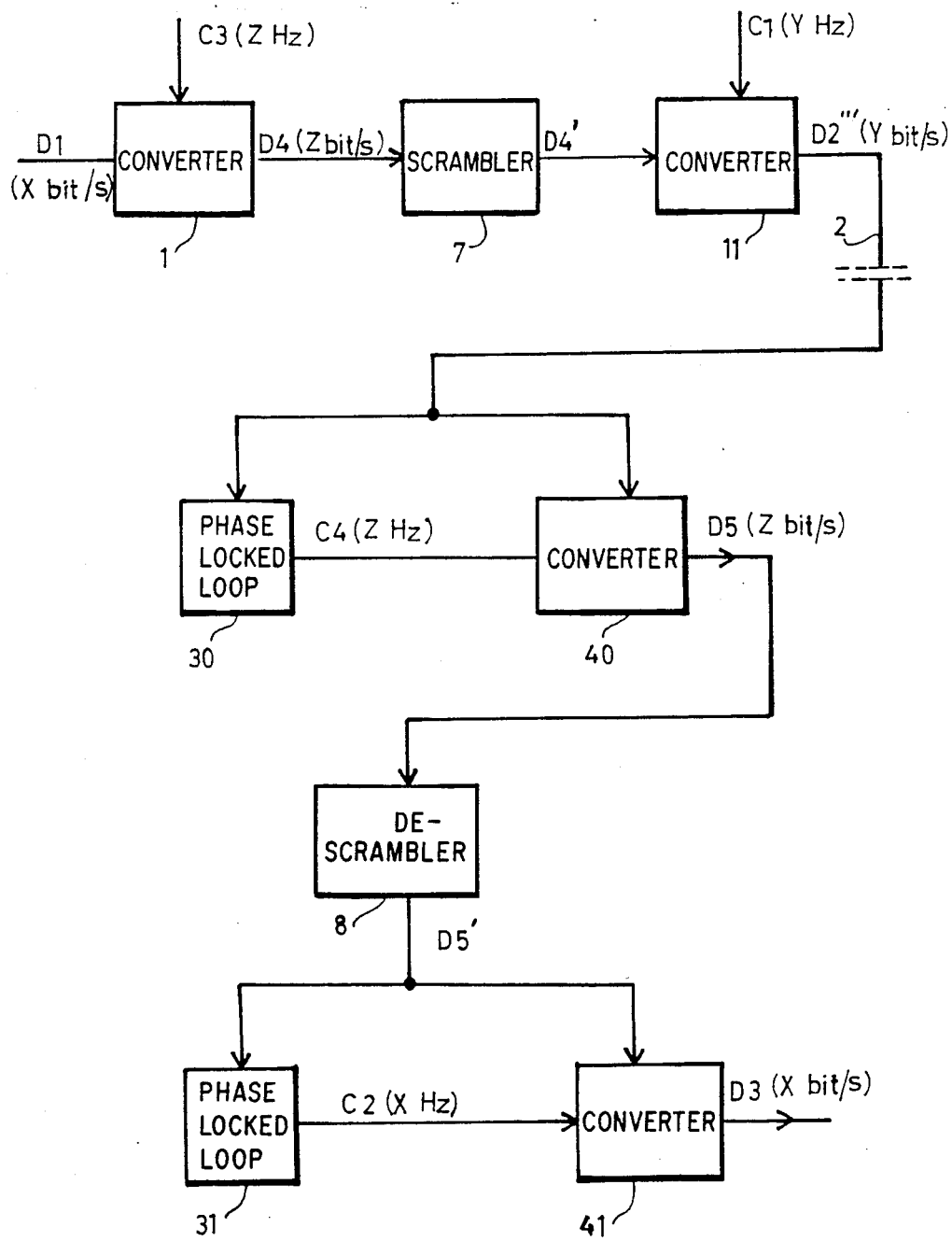

In FIG. 6 there is illustrated a third embodiment of an apparatus in accordance with the invention. According to this embodiment a so-called double over-sampling with scrambling is carried out in the transmitter. With double over sampling is intended that over-sampling takes place in two steps and as two separate over-samplings. The incoming data signal D1 with the bit rate X bits/s is first converted to a data signal D4 with the bit rate Z bits/s in a conversion means 1 in a corresponding way as previously, with the means 1 being supplied a clock signal C3 with the frequency Z Hz. The data signal D4 is supplied to a conversion means 7 of the same kind as the means 7 in FIG. 4, e.g. a so-called scrambler. The data signal from the means 7 is denoted D4' and is supplied to a second conversion means 11 of the same kind as the conversion means 1. The means 11 obtains a clock signal C1 with the frequency Y Hz at its clock signal input, whereby a data signal D2''' with the bit rate Y bits/s is formed. The data signal D2''' is transmitted on the line 2, on which the transmission rate is Y bits/s, to a means 30 and a means 40. The means 30 is of the same kind as the means 3 according to the above, but is adapted to generate a clock signal C4 with the frequency Z Hz. The means 40 is of the same kind as the means 4 according to the above, and converts the transmitted data signal D2''' with the bit rate Y bits/s to a data signal D5 with the bit rate Z bits/s. The data signal D5 is converted in a conversion means 8 of the same kind as the means 8 in FIG. 4, e.g. a so-called descrambler, to a data signal D5' having the same bit rate as the signal D5. The data signal D5' is supplied to a means 31 and a means 41 of the same kind as the means 30 and 40, respectively. The means 31, however, adapted to generate a clock signal C2 which, as with previous examples, has the frequency X Hz. The signal D5' is converted thereby in the means 41 to a data signal D3 with the bit rate X bits/s which, as with previous examples, constitutes an insignificantly delayed copy of the original, synchronous data signal D1.

Low denominator fractions can always be avoided with this apparatus. Furthermore, the problem which can occur due to unpermitted data sequences are avoided.

We claim:

1. Method of transmitting a synchronous data signal on a transmission medium on which the transmission rate is greater than the data signal bit rate, which includes the steps of, oversampling the data signal in a transmitter with a sampling frequency which is equal to the transmission rate on the transmission medium, transmitting the data signal on the transmission medium, generating a clock signal in a receiver such that the clock signal is phase-locked to the transmitted data signal and has a frequency which is substantially equal to the bit rate of the original synchronous data signal, and resampling the transmitted data signal with the clock signal formed in the receiver, wherein the improvement comprises the step of: modifying the synchronous data signal in the transmitter such that an uneven distribution of the transmitted data signal's edge positions in relation to their mean positions is avoided, whereby incorrect locking-in of the clock signal formed in the receiver is avoided.

2. Method as claimed in claim 1, which further includes modifying the synchronous data signal before the oversampling in such a way that fixed patterns of logical 1's and 0's are avoided and that a data signal resampled in the receiver is reformed into the original data signal.

3. Method as claimed in claim 1, which further includes phase modulating the synchronous data signal with a sine wave signal before the over-sampling.

4. Method as claimed in claim 1, wherein the oversampling includes a first and a second over sampling, and the resampling in the receiver includes a first and a second re-sampling, such that the data signal formed at the first over-sampling avoids fixed patterns of logical 1's and 0's and the data signal which is formed in the receiver at the first resampling is converted such that the data signal formed at the first over-sampling is reformed.

5. An improved apparatus of the type for transmitting a synchronous data signal on a transmission medium on which the transmission rate is greater than the data signal bit rate which includes means for over-sampling the data signal with a sampling frequency which is substantially equal to the transmission rate on the transmission medium, and wherein a receiver includes means for generating a clock signal which is phase locked to the transmitted data signal and has a frequency substantially equal to the bit rate of the original synchronous data signal, and means for resampling the received signal with the clock signal formed in the receiver, wherein the improvement comprises: means for modifying the synchronous data signal such that an uneven distribution of the edges of the transmitted data signal in relation to their mean positions is avoided, whereby incorrect locking-in of the clock signal formed in the receiver is avoided.

6. Apparatus as claimed in claim 5, wherein said means for modifying the synchronous data signal in the transmitter include means for avoiding fixed patterns of logical 1's and 0's in the transmitted data signal and the receiver also includes means for reforming the original data from a re-sampled data signal.

7. Apparatus as claimed in claim 5, wherein said means for modifying the synchronous data signal in the transmitter includes a signal generator and a phase modulator which are adapted to phase-modulate the synchronous data signal.

8. Apparatus according to claim 5, wherein said oversampling means in the transmitter include two separate means connected in a first series circuit, and said means in the receiver for generating a clock signal and for resampling includes two separate groups connected in a second series circuit, each of these groups including means for generating a clock signal which is phase locked to the data signal at its input and means for resampling the data signal with the generated clock signal and the apparatus also includes means added to the first series circuit for avoiding fixed patterns of logical 1's and 0's and means connected in said second series circuit for reforming the data signal.

* * * * *